3,333,446
SHEET METAL LEVELING AND SHEARING
APPARATUS AND METHOD
Laffie Harper, 1192 Montgomery Ave.,
San Bruno, Calif. 94066
Filed Aug. 24, 1964, Ser. No. 391,672
7 Claims. (Cl. 72—14)

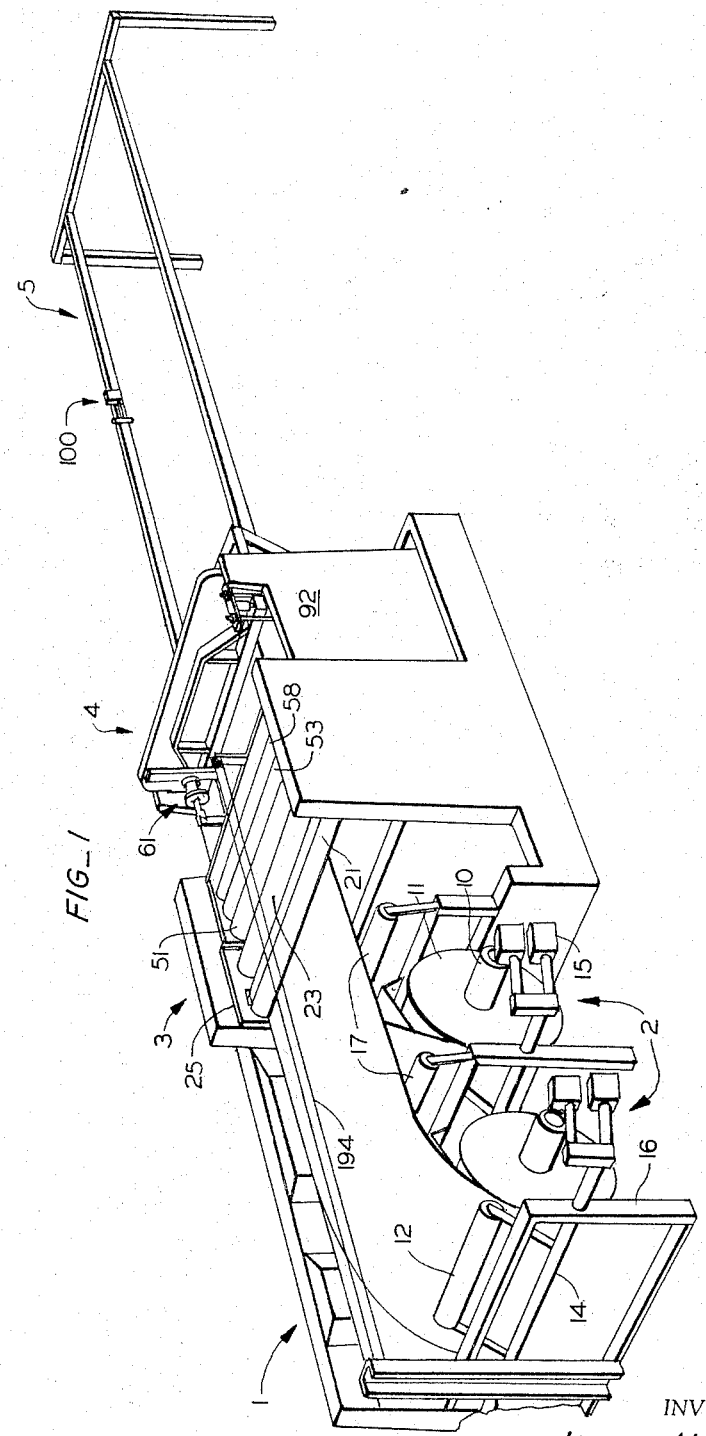

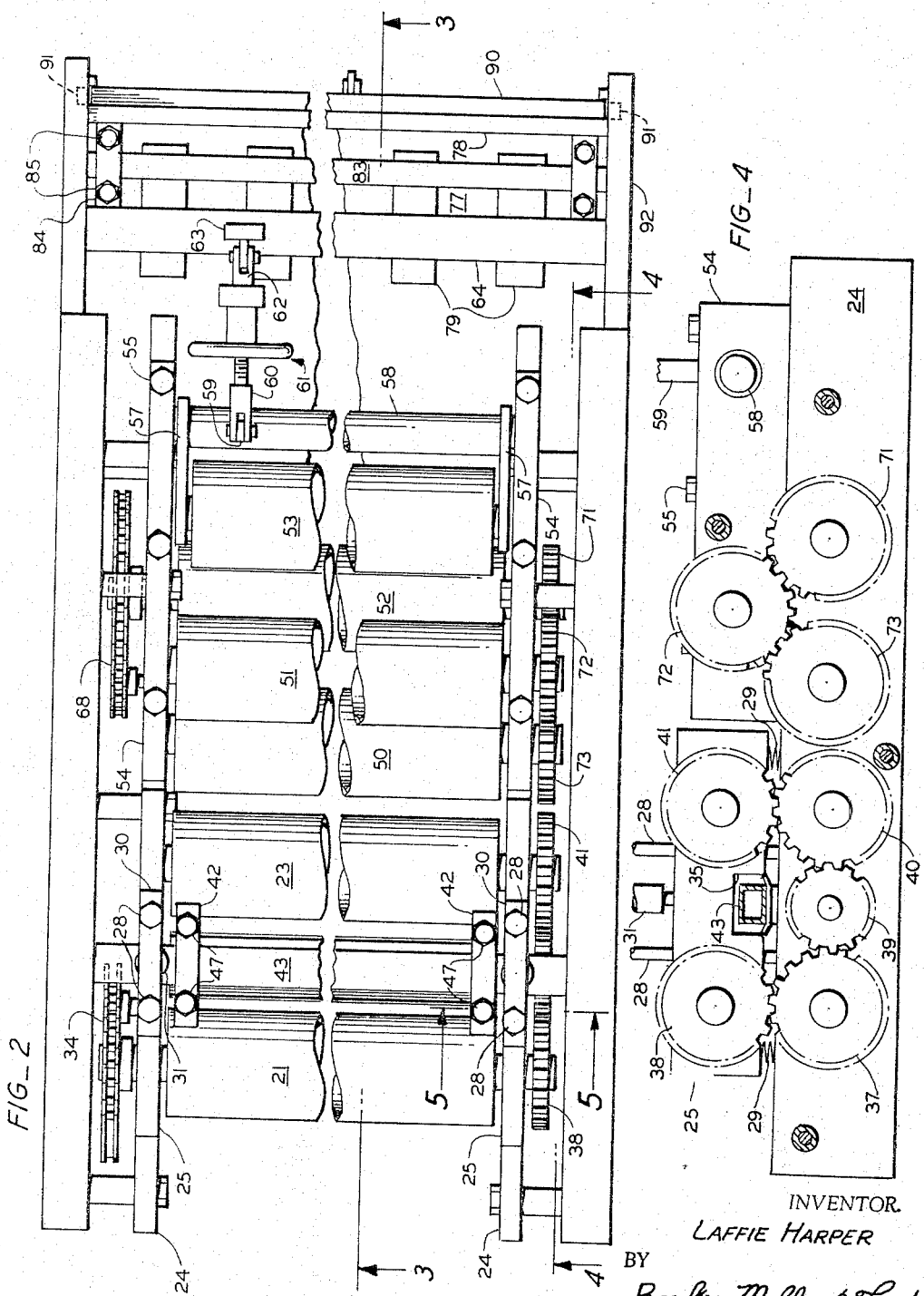

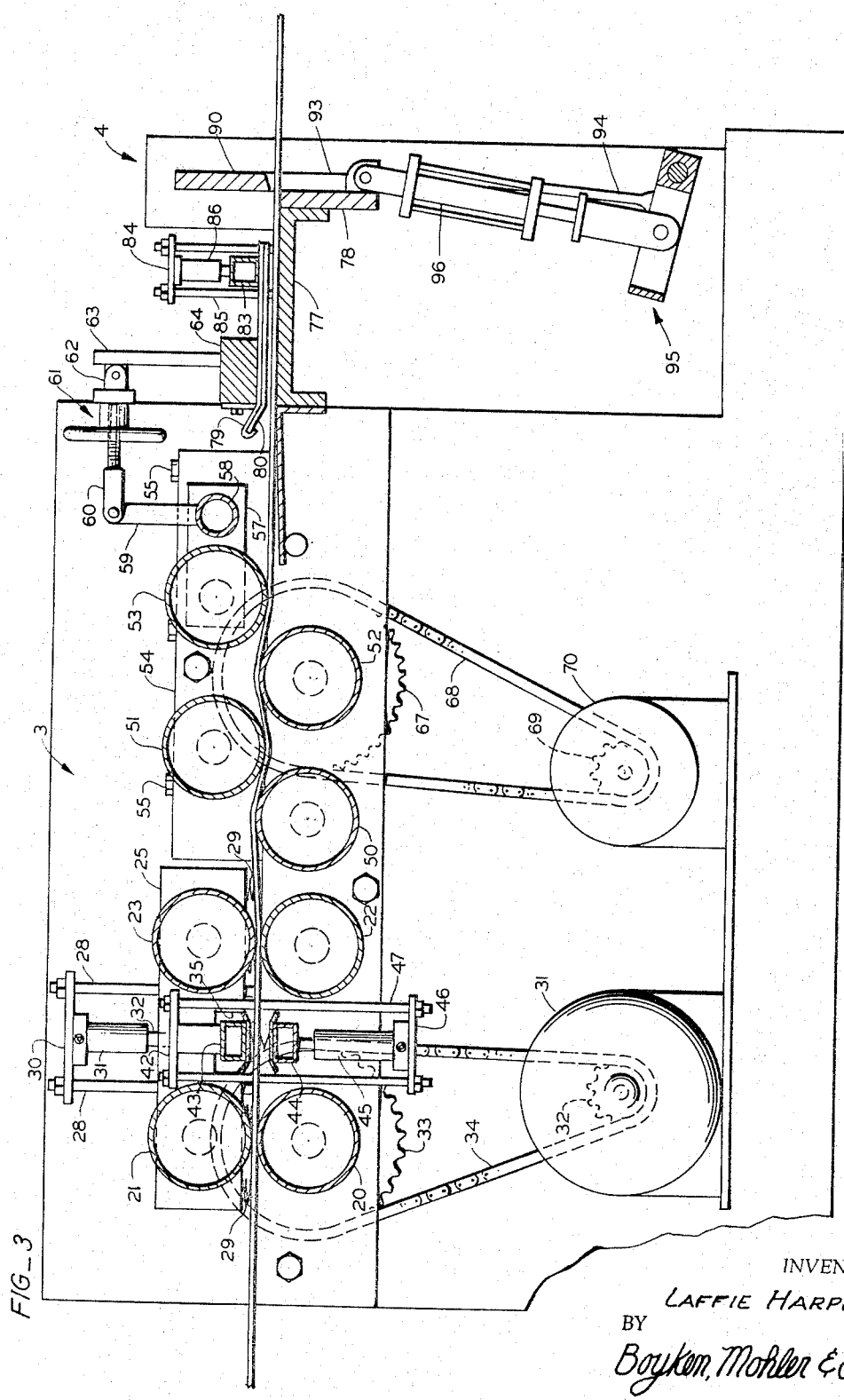

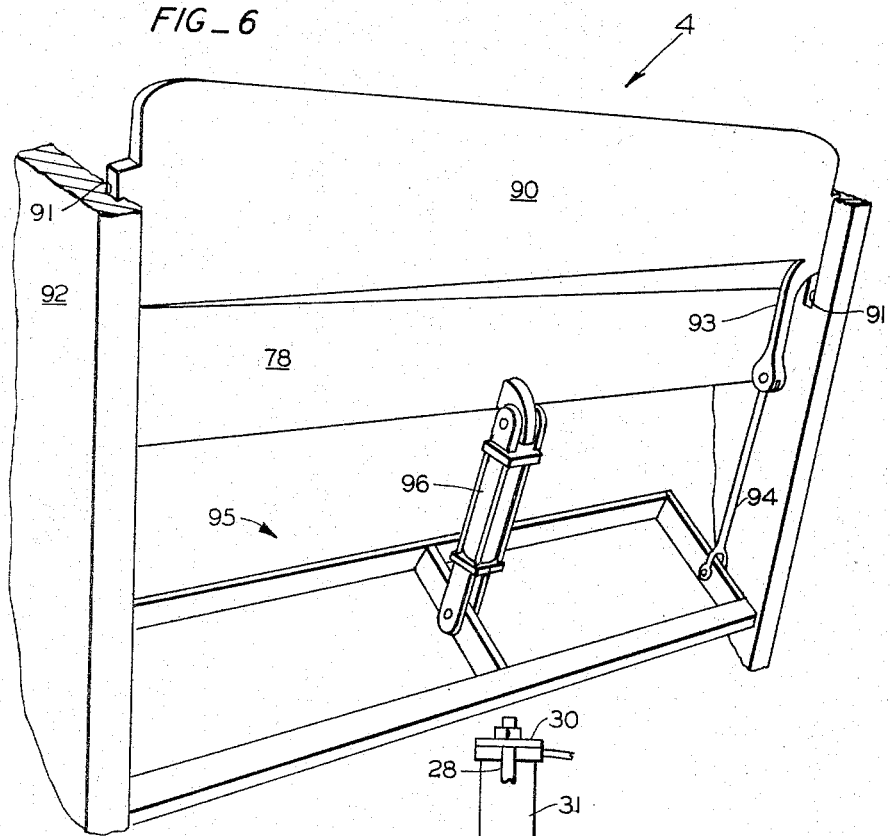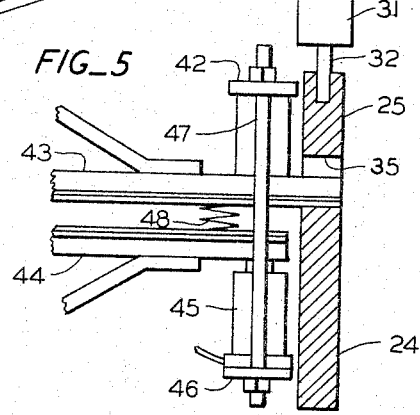

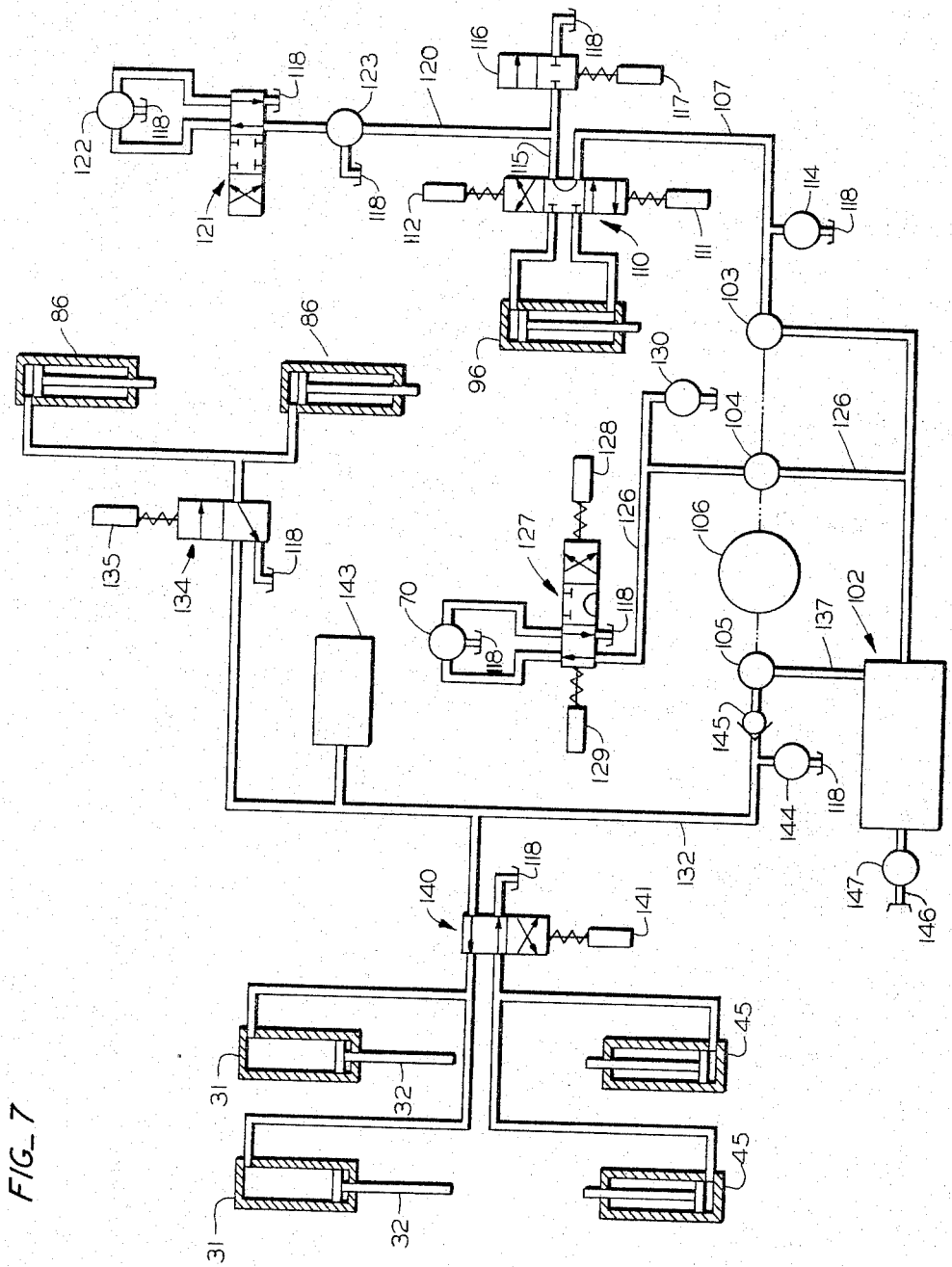

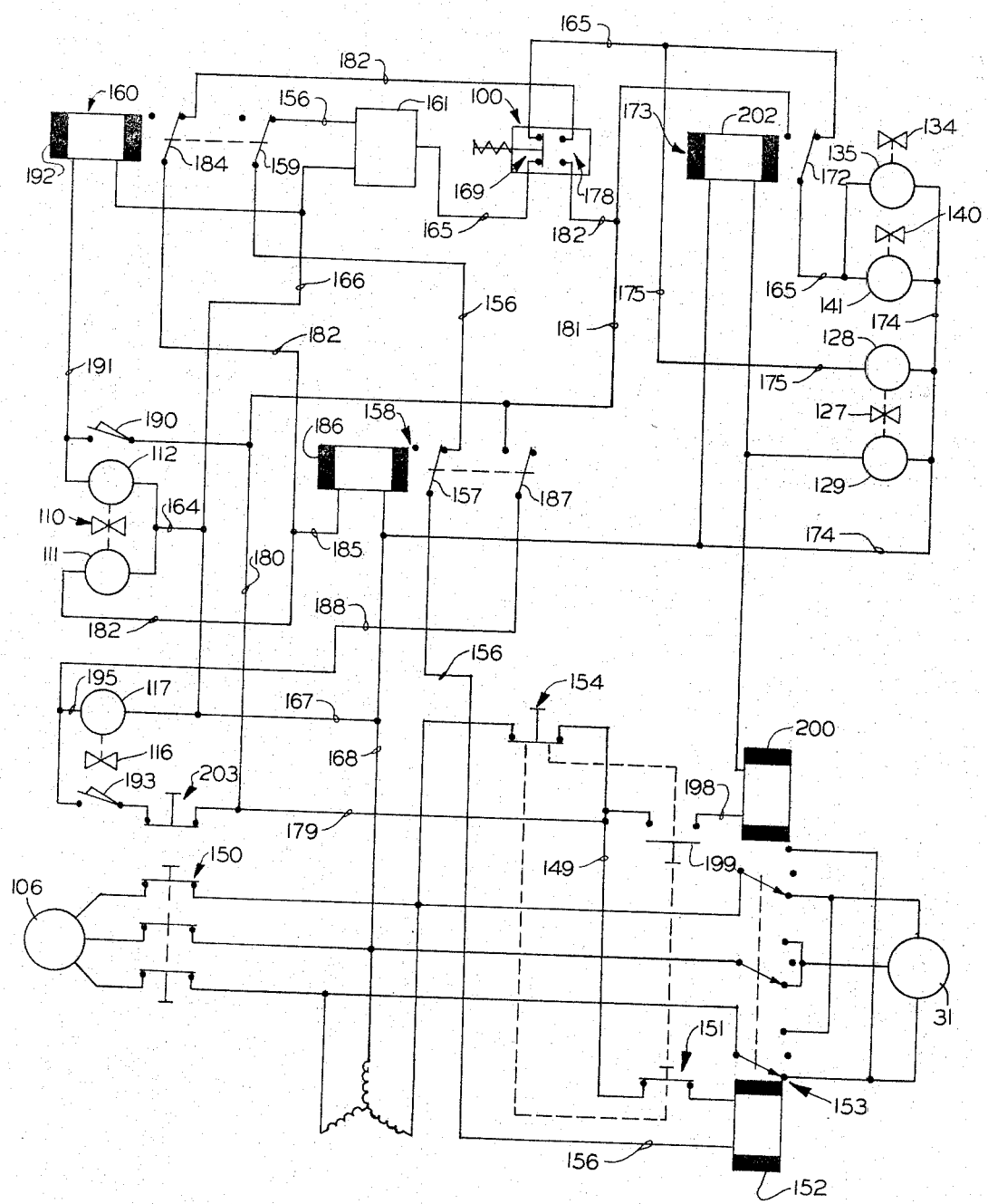
FIG_8

# United States Patent Office 3,333,446
Patented Aug. 1, 1967

ABSTRACT OF THE DISCLOSURE

Apparatus and method for storing a coil or coils of sheet metal for feeding such metal from one coil at a time through a leveling device and a shearing station at a constant rate of speed for removing the arcuate stress in such sheet metal and shearing it at predetermined lengths.

This present invention relates to machinery for preparing bulk, coiled sheet metal for shop use. More particularly the present invention relates to machinery for storing large coils or rolls of sheet metal, leveling said sheet metal to a flat condition for normal shop use, and accurately shearing the flattened sheet metal at predetermined lengths. The apparatus of this invention provides for feeding sheet metal from the coils thereof through leveling and shearing stations and for recoiling the extended, unused sheet metal back onto the roll after a desired number of links have been leveled and sheared.

It is an object of the present invention to provide an economical machine that is capable of handling a plurality of coils of bulk sheet metal each of which may be of a different width and/or gauge.

Another object of the present invention is to provide a machine which may be operated on a hydraulic system and which is capable of measuring and shearing links of sheet metal with a tolerance of as close as plus or minus 1/64 of an inch.

Still another object of the invention is to provide a machine which is capable of the characteristics above-mentioned without the use of expensive electronic control systems or electromechanical clutching arrangements.

Yet another object of the present invention is to provide a sheet metal leveling and shearing machine wherein the accuracy of the machine is based on a unique constant speed control method.

It is still another object of the present invention to provide a sheet metal leveling and shearing machine with the above-mentioned characteristics which is designed to operate throughout on alternating current and a hydraulic system with all of the accuracy of such machines which are designed to operate at least in part on direct current.

The above and other objects and advantages will be apparent in the specification taken in conjunction with the drawings, in which:

FIG. 1 is a perspective view of the sheet metal leveling and shearing machine of this invention and illustrating a storage capacity of two coils of sheet metal;

FIG. 2 is a top plan view, partially broken away, of the leveling and shearing portion of the present invention;

FIG. 3 is a sectional view taken substantially along line 3—3 of FIG. 2;

FIG. 4 is an elevational sectional view taken substantially along line 4—4 of FIG. 2;

FIG. 5 is a sectional view taken substantially along line 5—5 of FIG. 2;

FIG. 6 is a perspective view, partially broken away, of the shearing station of the present invention;

FIG. 7 is a schematic diagram of the hydraulic system of the present invention; and, FIG. 8 is a schematic wiring diagram of the electrical system of the present invention.

Referring first to FIG. 1, the machine of this invention includes a bulk metal storage station generally indicated at 1. At storage station 1, either a single or any desired plurality of coils of metal which may weigh as much as five thousand (5,000) pounds each are received on motor driven reels 2 from which the metal of the coils may be fed toward the leveling station.

The end of the machine at which coils 2 are stored will hereinafter be referred to as the forward portion of or the front of the machine. As the metal is fed from the coils it extends rearwardly of the machine or toward the rear or back of the machine.

It will be appreciated that as the coils of metal are unwound the metal that is extended therefrom will have an arcuate stress thereto. In order to be useful in a sheet metal shop this metal must first be leveled or flattened. Thus, from storage station 1 the uncoiled metal extends toward a leveling station 3 at which the arcuate stress in the metal is relieved and from which the metal emerges in a leveled or flattened condition ready for shop use.

From leveling station 3 the flattened metal is fed through a shearing station generally indicated 4 and onto a runout table 5.

Substantial amounts of labor and material can be conserved by automatically cutting the sheet metal to accurate predetermined lengths for shop use.

More specifically, and referring first to storage station 1, large coils of bulk sheet metal as provided by manufacturers are received on the cores 10 of reels 2 and an end plate 11 is received on said core and secured thereto adjacent the edge of the coil of metal. A tension roller 12 is provided and is adapted to be held in engagement with the sheet metal at a point near where it leaves the coil thereof by counter weights 15, both roller 12 and weights 15 being secured to the same side of a rod 14 which is in turn rotatably mounted in a frame member 16.

In order to load a coil of sheet metal on reels 2 weights 15 are rotated counterclockwise as seen in FIG. 1 thereby rotating tension roller 12 away from reel 2. This removes both roller 12 and weights 15 from positions obstructing access to reel 2. End plate 11 may then be removed and a coil of sheet metal may be placed on core 10 of reels 2. Weights 15 may then be rotated clockwise again positioning roller 12 in engagement with the sheet metal. In such position roller 12 tends to control erratic behavior of the sheet metal as it uncoils and also guides the extended sheet metal rearwardly toward the leveling station 3. Similar rollers 17 are provided rearwardly of each reel 2 to provide support for the sheet metal from beneath and also guide it toward the leveling station.

Leveling station 3 is best illustrated in FIG. 3. From storage station 1 sheet metal enters leveling station 3 from the left as seen in FIG. 3 and is first received between two pairs of speed controlling, secondary driving or feeding rollers 20, 21 and 22, 23 respectively. Rollers 20 and 22, the lower rollers of each pair thereof, are rotatably mounted in fixed positions in frame members 24 adjacent the ends of said rollers. Rollers 21 and 23, the upper rollers of each pair thereof, are rotatably mounted in floating blocks 25 which are adjacent the ends of said rollers and are vertically aligned over frame members 24.

Blocks 25 are slidably received on a pair of vertically extending parallel bolts 28 which are secured at their lower ends in frame members 24. Inter posed between blocks 25 and frame members 24, and tending to urge said blocks upwardly away from members 24, are a plurality of coil springs 29. Secured across the upper ends of bolts 28 are plates 30 depending from which, intermediate bolts 28, are hydraulic cylinders 31. The pistons 32 of cylinders 31 extend into a complimentary bore in the upper edge of each block 25. When hydraulic pressure in each cylinder 31 is relieved, springs 29 urge blocks 25, and therefore rollers 21, 23, upwardly and out of pinching engagement with sheet metal which may be interposed between the upper and lower rollers of each pair thereof. When hydraulic pressure is applied to cylinders 31, blocks 25 and therefore upper rollers 21, 23 are forced downwardly into pinching engagement with sheet metal which may be interposed between the upper and lower rollers of each pair thereof.

Rollers 20–23 are rotated by an induction motor 31 having synchronous operation characteristics. Received on the shaft of motor 31 is a sprocket wheel 32 which is connected with a sprocket wheel 33 on the shaft of roller 20, outwardly of frame member 24, by a chain 34.

Received on the shaft of roller 20, at the end opposite to sprocket wheel 33 and outwardly of frame member 24 (FIGS. 2 and 4), is gear wheel 37. Gear wheel 37 is in mesh with a similar gear wheel 38 which is received on the shaft of roller 21. Gear wheel 37 is also in mesh with an idler gear 39 which in turn is in mesh with a gear wheel 40 which is received on the shaft of roller 22, wheel 40 being in mesh with a gear wheel 21 which is received on the shaft of upper roller 23.

By the above-described arrangement it can be seen that feed roller 20 is directly driven by synchronous motor 31 and in turn drives feed rollers 21, 22 and 23 by means of gears 37–41.

The upward movement of blocks 25 under the urgency of springs 29 is limited such that upper gear wheels 38 and 41 do not disengage lower gears 37, 40.

Located intermediate the pairs of feed rollers 20, 21 and 22, 23 are a pair of clamping members 43, 44 which are positioned respectively above and below a sheet of metal passing therebetween. Upper clamping member 43 is rigidly secured at both ends to frame members 24 (FIGS. 2–4). The ends of stationary upper clamp 43 are received in cutouts 35 in the lower edges of blocks 25 thereby allowing blocks 25 to reciprocate unobstructed by clamp 43. Clamp 43 is so positioned that when rollers 21, 23 are engaging a sheet of metal there is a space between the metal and the lower side of clamp 43 to prevent any scarring of the metal. When rollers 21, 23 are spring urged upwardly the extreme lower edge of said rollers is higher than the lower surface of clamp 43.

Clamping member 44 is similar in construction to clamping member 43 and is positioned in spaced, opposed, vertical alignment beneath clamp 43. Clamp 44 is supported by a pair of single acting hydraulic cylinders adjacent each end thereof, said cylinders being inwardly of each frame member 24. Each cylinder 45 is in turn supported on a plate 46 which is hung by tie rods 47 from a mounting bracket 42 secured to clamp 43.

The piston of cylinder 45 is extended forcing clamping member 44 upwardly only when rollers 21, 23 are urged upwardly by springs 29 and out of contact with sheet metal between the upper and lower rollers of the pairs thereof. Thus when clamp 44 is urged into clamping relation with clamp 43 the sheet metal then positioned between the upper and lower rollers of the pairs of feeder rollers is carried upwardly out of contact with lower rollers 20, 22 and the upper rollers 21, 23 are spring urged upwardly above the lower surface of clamp 43. By this arrangement it can be seen that rollers 20–23 may continue rotating without scarring the sheet metal and thereby allowing motor 31 to remain in a synchronous phase of operation while clamps 43, 44 are in clamping relation.

Movable clamping member 44 is spring urged away from clamping member 43 to an inoperative or open position by a pair of springs 48 (FIG. 5) interposed between said clamping members near their ends.

From the speed controlling feeder rollers sheet metal passes between a plurality of primary driving and leveling rollers 50, 51, 52 and 53. Upper leveling rollers 51, 53 are offset rearwardly with respect to lower leveling rollers 50, 52 in a staggered relation.

The staggered leveling rollers are so positioned as to vertically deflect the normally horizontal path of travel of sheet metal, thereby relieving or counterstressing the arcuate stress on the metal caused by having been stored in a coil.

The shaft of rollers 50, 52 at either end thereof are mounted in bearings in frame members 24 (FIGS. 2 and 3). The shaft of upper roller 51 is rotatably mounted at either end thereof in blocks 54, which blocks are rigidly secured to the upper side of frame members 24 as by bolts 55.

The shaft of idler roller 53 at either end thereof is rotatably mounted in links 57 which links are positioned inwardly of frame members 24. Links 57 are rigidly secured to a shaft 58, the ends of which are rotatably mounted in blocks 54. Secured to shaft 58 and extending generally upwardly therefrom is a crank arm 59 which is pivotally secured at its upper end in a clevis 60. The other end of clevis 60 is threadedly received in a turnbuckle structure 61 which is in turn rotatably received on a clevis 62. Clevis 62 is pivotally connected to an upwardly extending bracket which is in turn rigidly secured at its lower end to a frame member 64. It can be seen by the above arrangement that when turnbuckle structure 61 is rotated, clevis 60 is screwed either inwardly or outwardly thereof moving crank arm 59 respectively rearwardly or forwardly of the machine. As crank arm 59 is moved rearwardly of the machine, or to the right as seen in FIG. 3, shaft 58 is rotated clockwise thereby raising roller 53 and widening the gap between rollers 53 and 52. As crank arm 59 is moved forwardly of the machine, or the left as seen in FIG. 3, shaft 58 is rotated counterclockwise and roller 53 is lowered narrowing the gap between rollers 53 and 52. Adjustment of roller allows the machine to accommodate various gauges of sheet metal.

Outwardly of one of the frame members 24 and received on the end of the shaft of roller 52 is a sprocket wheel 67 (FIGS. 2 and 3). Through chain 68 sprockets 67 is in connection with a driving sprocket 69 which is secured to the end of the shaft of a hydraulic motor 70. As seen in FIG. 4, the shaft of roller 52 at the end opposite sprocket wheel 67 carries a gear wheel 71. Gear wheel 71 is in meshing engagement with a gear wheel 72 secured to the shaft of roller 51, and gear wheel 72 is in turn in meshing engagement with a similar gear wheel 73 secured on the shaft of roller 50. Through the above gearing arrangement, rollers 50, 51 and 52 are driven together by hydraulic motor 70, roller 53 being an idler roller.

As flattened, or leveled, sheet metal passes from the leveling station 3 it enters the shearing station 4. At shearing station 4 the sheet metal passes over a shear bed 77 and a stationary shear plate 78 secured to the rearward side of bed 77 and under a plurality of leaf springs 79 secured to the lower surface of frame member 64 and extending longitudinally of the machine (FIGS. 2 and 3). Bonded to the lower side of each leaf spring 79 is a neoprene pad 80 for preventing metal to metal contact between springs 79 and sheet metal passing thereunder, preventing scarring of the sheet metal.

Secured to the upper surface of the trailing ends of springs 79 is a shear clamp member 83. At each end of clamp 83 and outwardly of frame members 24 a pair of bolts 85 extend upwardly from shear bed 77 and support a plate 84 on their upper ends. The bolts and plate arrangements straddle sheared clamp 83 at either end thereof, plates 84 being above clamp 83. Secured to the lower side of plates 84 and depending therefrom are hydraulic cylinders 86. The piston of cylinders 86 is in engagement with the upper surface of shear clamp member 83 at either end thereof. When the pistons of cylinders 86 are extended, clamp 83 is lowered clamping sheet metal between neoprene pads 80 and the shear beds 77. When the hydraulic pressure to cylinders 86 is relieved, the pistons thereof and clamp 83 are returned to a raised or inoperative position by springs 79.

A movable shear blade 90 is positioned rearwardly of shear clamp 83 and in shearing relation to stationary shear blade 78. Shear blade 90 is supported at each end in grooves 91 in frame members 92 for vertical reciprocable movement toward and away from shearing relation with stationary shear blade 78 (FIGS. 2, 3 and 6).

Extending downwardly from shear blade 90 at either end thereof inwardly of frame members 92 are lowering arms 93. Pivotally connected to the lower end of each arm 93 is a tie rod 94 which is in turn pivotally connected at its lower end to a treadle assembly 95. It can be seen that when treadle assembly 95 is lowered and raised, shear blade 90 will be respectively lowered and raised into and out of shearing relation with stationary shear blade 78.

Treadle assembly 95 is lowered and raised hydraulically by means of a cylinder 96 interconnected between the lower side of stationary blade 78 and treadle assembly 95.

From shearing station 4, leveled sheet metal passes onto run-out table 5 (FIG. 1). Movably supported on run-out table 5 is a limit switch 100 which may be moved linkwise of table 5 to predetermined positions to regulate the link of a sheet of flattened metal to be sheared. The function and operation of limit switch 100 will be described later in greater detail.

From run-out table 5 sheared, flattened sheet metal may be stacked or conveyed away by any of several commercially available stacking or conveying devices.

Referring now to FIG. 7, the schematic diagram of the hydraulic system of the present invention, it will be noted that several elements appear therein which do not appear elsewhere in the drawings for the reason that most of the hydraulic system is concealed by other structure.

Included in the hydraulic system is a liquid reservoir 102 from which supply lines lead to various pumps. In the present embodiment the hydraulic system is supplied by three pumps 103, 104 and 105, all of which are driven by one electric motor 106.

A supply line 107 extends from reservoir 102 through pump 103 to a three position, double solenoid valve 110 which is actuated by a pair of solenoids 111, 112 and spring returned to a neutral position when each of said solenoids is de-energized. Valve 110 is the control means for hydraulic cylinder 96 (FIGS. 3 and 6) which cylinder lowers and raises the shear blade. A pressure release valve 114 may be interposed in line 107 between pump 103 and valve 110 to relieve any excess pressure in line 107.

When valve 110 is in position to either raise or lower the piston of cylinder 96, the return fluid from the opposite side of the piston flows through a return line 115 and a solenoid actuated valve 116 operatively connected to a solenoid 117 to permit return of fluid to reservoir 102, which return is indicated by symbol 118, said symbol indicating a return to reservoir throughout FIG. 7.

A branch conduit 120 leads from conduit 115 to a stack valve 121 which controls the direction of flow of hydraulic motor 122. Stack valve 121 is manually operated and is capable of driving motor 122 in either a forward or reverse direction and also has a neutral position which locks the movement of motor 122. Motor 122 is operatively connected to one of the reels 2 of FIG. 1 on which coils of bulk sheet metal are stored to unwind, or rewind, sheet metal from the coil thereof. It will be understood that only one motor of 122 and stack valve 121 are illustrated in FIG. 5, however there will be one such motor and valve for each reel 2 in a given installation.

Interposed between conduit 115 and stack valve 121 in conduit 120 is a variable reel speed control valve 123. Variations in reel speed control valve 123 affect the speed of hydraulic motor 122 and therefore the speed at which sheet metal will be unwound or rewound on reel 2.

Hydraulic pump 104 is interposed and a branch supply conduit 126 which leads from supply conduit 107 to a double solenoid, three position valve 127. Valve 127 controls the forward and reverse rotation of a hydraulic motor 70 which drives leveling rollers 50–53 (FIG. 3). The positioning of valve 127 is controlled by a pair of solenoids 128, 129, said valve being spring urged to a neutral position when both of said solenoids are de-energized. When valve 127 is in a neutral position, hydraulic motor 70 and therefore leveling rollers 50–53 are instantly stopped.

A relief valve 130 may be provided in conduit 126 between pump 104 and valve 127 for the same purpose as relief valve 114 in conduit 107.

Pump 105 may be interposed in a supply conduit 132 which leads from reservoirs 102 to a pair of solenoid actuated valves 134 and 140. Valve 134 may be a two position valve and is actuated to one position by a solenoid 135 and is spring returned to the second of said two positions. Valve 134 controls the actuation of shear clamp cylinders 86 (see FIG. 3) to lower shear clamp 83 at the desired time. When the pistons of shear clamp cylinders 86 are extended, shear clamp 83 is lowered to clamping relation with shear bed 77. As previously mentioned, shear clamp 83, and therefore the pistons of shear clamp cylinders 86, are returned to upper positions by leaf springs 79.

It should be noted that when solenoid 135 is energized, valve 134 is in the position illustrated in FIG. 7 and the pistons of cylinders 86 are being spring urged by springs 79 (FIG. 3) to the positions illustrated in FIG. 7. When solenoid 135 is de-energized, valve 134 is spring urged to the second of its two positions wherein cylinders 86 are charged with hydraulic fluid under pressure and the pistons thereof are extended. The purpose of this arrangement is important and will be explained in greater detail in conjunction with the electrical diagram of FIG. 8.

Valve 140 is also a solenoid actuated, two position valve which is urged to one position by the energization of solenoid 141 and is spring urged to the other of its two positions. When solenoid 141 is energized, valve 140 is urged to the position illustrated in FIG. 7 wherein hydraulic cylinders 31 (see also FIG. 3) are charged with hydraulic fluid under pressure and the pistons 32 thereof are extended.

Referring now to FIG. 3, it will be recalled that when pistons 32 of cylinders 31 are extended, blocks 25 are urged downwardly against the urgency of springs 29, thereby forcing feed rollers 21, 23 downwardly into feeding engagement with sheet metal positioned between the upper and lower feed rollers of each pair thereof.

When cylinders 31 are charged (FIGS. 3 and 7) it can be seen that the return line 118 is opened to roller clamp cylinders 45. Clamp 44, and therefore the pistons of clamp cylinders 45, are spring urged downwardly as previously described and the hydraulic fluid in cylinders 45 is substantially exhausted.

When solenoid 41 is de-energized, valve 140 is spring urged to the second of its two positions wherein roller clamp cylinders 45 are charged with fluid under pressure and return line 118 is opened to cylinders 31. The pistons 32 of cylinders 31 are spring urged upwardly by springs 29 (FIG. 3), exhausting fluid from cylinders 31.

Referring again to FIG. 3, when cylinders 45 are charged and the pistons thereof extended, clamping member 44 is urged upwardly into clamping relation with stationary clamping member 43.

Again the particular actuation of solenoid 141 and valve 140 is important and will be explained in conjunction with the electrical diagram of FIG. 8.

Interposed in conduit 132 is a hydraulic pressure accumulator 143, the purpose of which is to apply reliable accurately controlled hydraulic pressure to valves 134, 140 and therefore clamps 44 and 83.

Conduit 132 may also be supplied with a relief valve 144 which serves the same purpose as valves 130, 144 in conduits 126, 107 respectively. Conduit 132 may additionally be provided with a check valve 145 to resist any back pressures occasioned by actuation of accumulator 143.

All return fluid lines 118 may be connected to a return manifold indicated at 146 in which there may be a filter 147 for fluids returning to reservoir 102.

The operation of the present invention may best be described in conjunction with the wiring diagram, FIG. 8, making necessary references to the other figures.

Operation may be started by closing the circuit to motor 106 with switch 150 thereby starting hydraulic pumps 103, 104 and 105 and building up hydraulic pressure throughout the system. Switch 150 may have both starting and stopping buttons mechanically connected thereto for both starting and stopping motor 106.

Another switch 151 is depressed closing the circuit 149 to a forward starter coil 152 which, in turn, positions the starter relay, generally indicated 153, of synchronous motor 31 to a position closing the circuit to said synchronous motor for forward rotation. Closing switch 151 also closes stop switch 154 which is mechanically connected thereto providing single phase current for forward coil 152 and the remainder of the electrical control system from the three phase source of current supplied to motors 106, 31. Closing circuit 149 also closes a circuit 156 through a normally closed switch 157 in relay 158 and from there through a normally closed switch 159 in relay 160 and then to a time delay relay 161. Time delay relay 161 is important in the continuous repetitive operation of the machine but plays little part when the machine is initially started.

In the momentary delay before time delay relay 161 is energized, incoming current can pass through lines 166, 167 and 168 thereby completing the circuit to the time delay relay. When time delay relay 161 is energized, a circuit 165 is closed to normally closed contacts 169 of limit switch 100 (see also FIG. 1) and from said limit switch through a normally closed switch 172 in relay 173, and then to solenoids 135, 141 of shear clamp valve 134 and roll clamp valve 140, respectively (see also FIG. 7). As previously described, when solenoids 135 and 141 are energized, valves 134 and 140, respectively, are so positioned as to relieve the pressure on cylinders 86 and 45, respectively (FIG. 7) which in turn allows shear clamp 83 and roller clamp 44 (FIG. 3) to be spring urged to open, non-clamping positions. The circuit to solenoids 135, 141 is completed through return lines 174, 168.

A branch circuit 175 leads off of that portion of circuit 165 which extends between limit switch 100 and relay 173 and circuit 175 energizes solenoid 128 to position hydraulic valve 127 so that hydraulic motor 70 is driven in a forward direction as seen in FIG. 7. The circuit to solenoid 128 is completed through return lines 174, 168.

At this point in the operation, synchronous motor 31 and pump motor 106 are in operation, roller clamp 44 and shear clamp 83 are in inoperative positions, and hydraulic motor 70 which, as previously described, drives leveling rollers 50–53 is in operation for advancing a sheet of metal from the left to the right as seen in FIGS. 1–4. When valve 140 is positioned to relieve cylinders 145 (FIGS. 3 and 7) cylinders 31 are charged with hydraulic pressure to lower blocks 25 and therefore upper feeder rollers 21, 23 into pinching feeding relation with lower feeder rollers 20, 22, said feeder rollers being driven by synchronous electric motor 31.

The particular sheet metal desired to be flattened or leveled and sheared may be selected from the reels 2 thereof (FIG. 1) by manually actuating the particular stack valve 121 (FIG. 7) which controls the particular reel 2 selected. Valve 121 is positioned to drive hydraulic motor 122, the motor which is operatively connected to the reels selected, in an unwinding direction. As the sheet metal is unwound and advances from storage station 1 toward leveling station 3 (FIG. 1), the metal is first received at station 3 between the upper and lower feed rollers of the pairs thereof (FIG. 3). The metal then passes between the upper and lower leveling, or stress relieving, rollers 51, 53 and 50, 52, respectively. For thicker gauges of sheet metal adjustable roller 53 may be moved upwardly as seen in FIG. 3 so as not to produce a counterstress in the sheet metal as it leaves the leveling rollers. For thinner gauges of sheet metal, which would tend to take a straighter course between the leveling rollers, adjustable roller 53 may be moved downwardly as seen in FIG. 3 to compensate for said straighter path of travel and thereby assure leveling.

The leveled sheet metal may then pass over shear bed 77 and beneath leaf springs 79 and pads 80 which are secured to frame member 64. As the sheet metal continues to advance rearwardly of the machine, it passes beneath shear clamp 83 and through the shear blades 78, 90 and onto run-out table 5 (FIG. 1). Limit switch 100 on run-out table 5 will have been previously located in the proper position to shear the flattened sheet metal at the desired length.

As the leading end of the sheet metal reaches limit switch 100, it trips the armature thereof opening normally closed contacts 169 and closing a pair of normally opened contacts 178.

When contacts 169 are opened the circuit 165 leading out of time delay relay 161 is broken and said relay is allowed to reset for its relaying function, the circuit for the coil of said relay again being completed through return lines 166, 167 and 168.

The opening of contacts 169 of limit switch 100 also breaks the circuit 165 to switch 172 of relay 173 and the solenoids 135, 141 of hydraulic valves 134, 140, respectively, are de-energized. Referring to FIG. 7, it will be recalled that when solenoids 135, 141 are de-energized, valves 134, 140, respectively, are spring urged to positions wherein cylinders 86, 45, respectively, are charged with hydraulic fluid under pressure thereby actuating clamping members 83, 44, respectively, (FIG. 3).

As previously mentioned, the arrangement whereby clamps 83 and 44 are actuated when solenoids 135, 141 are de-energized is an important feature in the accuracy of the shearing operation. It has been found that the timing of the actuation of cylinders 86, 45 is more accurate and predictable when the valves controlling the actuation of the cylinders are moved to positions in which said cylinders are actuated by spring means rather than by the energization of their respective solenoids. If valves 134, 140 were to actuate clamps 83, 44 upon energization of solenoids 135, 141, such energization might occur during a mean phase in the sine wave of the alternating current by which said solenoids are energized, causing a slight delay in the clamping of the sheet metal while the sine wave of the alternating current is reaching a positive or negative peak. Thus, the constant predictable response of spring means to actuate valves 134, 140 and clamps 83, 44 assures more accurate shearing of the sheet metal.

When roller clamp 44 and shear clamp 83 are actuated cylinders 31 are deactuated and blocks 25 carrying upper feeder rollers 21, 23 are spring urged upwardly as previously described (FIG. 3).

The opening of contacts 169 of limit switch 100 also breaks the circuit 175 to solenoid 128 of valve 127 which controls the operation of hydraulic motor 70. When neither of the solenoids 128, 129 of valve 127 are energized, said valve is spring urged to a position wherein hydraulic motor 70 is immediately stopped thereby stopping the rotation of leveling rollers 50–51. The combination of clamps 44 and 83 and the breaking effect of hydraulic motor 70 securely stops the movement of sheet metal from passing through the machine with a slight but accurately predictable and therefore accountable delay.

The closing of contact 178 of limit switch 100 closes a circuit 182 through incoming lines 179, 180, and 181. Circuit 182 extends through contacts 178 and through a second normally closed switch 184 in relay 160 and energizes the solenoid 111 of hydraulic valve 110 to extend the piston of hydraulic cylinder 96 and thereby lower the movable shear blade 90 (see also FIGS. 3 and 7). A branch circuit 185 leads from circuit 182 to energize the coil 186 of relay 158 thereby opening normally closed switch 157 of said relay in closing a normally opened switch 187. The circuit to coil 186 of relay 158 is completed by a return line 168 while the circuit to solenoid 111 is completed by return lines 164, 166, 167 and 168.

Referring to FIG. 7, when valve 110 is positioned to extend the piston of cylinder 96, hydraulic pressure to reel motor 122 is stopped and reels 2 (FIG. 1) stop unwinding sheet metal toward leveling station 3. The hydraulic fluid being expelled from double acting cylinder 96 is allowed to return to the reservoir 102 through a tank valve 116 which is positioned to allow said fluid to pass therethrough when the solenoid 117 connected to said valve is energized by the closing of switch 187 of relay 158 (FIG. 8). The circuit to solenoid 117 is completed by return lines 167, 168.

When shear blade 90 reaches the bottom of its stroke it trips a limit switch 190 (FIG. 6) thereby closing a circuit 191 to both coil 192 of relay 160 and solenoid 112 of valve 110 through incoming lines 180, 179. When coil 192 of relay 160 is energized, normally closed switches 184 and 159 of relay 160 are opened. The opening of switch 184 opens the circuit 182 to de-energize both the coil 186 of relay 158 and solenoid 111 of valve 110. Solenoid 112 having been energized by the closing of limit switch 190 positions valve 110 so that the piston of cylinder 96 is withdrawn into said cylinder and shear blade 90 (FIG. 3) is again raised.

When shear blade 90 reaches the top of its stroke, limit switch 190 is again opened, breaking circuit 191 to coil 192 of relay 160 and solenoid 112. At this time neither of solenoids 111 or 112 is energized and valve 110 is spring returned to a position wherein hydraulic pressure is again supplied to reel motor 122 so that sheet metal is again unwound from reels 2 (FIG. 1).

After the metal has been sheared it may fall away or be taken away from the engagement with the armature of limit switch 100, thereby allowing said switch to be spring returned to a position in which contacts 169 are closed. At this time the entire cycle of operation will again be repeated after a slight delay caused by time delay relay 161. It can be seen that the cycles of operation will continue repetitively until common stop switch 154 is opened breaking the circuit of single phase current to forward starter switch 151 and forward starter coil 152. When coil 152 is de-energized, starter relay 153 is urged to an inactive position breaking the three phase circuit to synchronous motor 31. To completely stop operation of the machine switch 150 can be opened thereby stopping pump motor 106 and hydraulic pumps 103, 104 and 105 operated thereby.

It should be noted that speed at which sheet metal will be unwound from reels 2 will decrease as the size of the coil metal decreases, assuming that reel motors 122 are driven at a constant speed. Thus the speed of motor 122 must be set by reel speed control valve 123 so that metal will be unwound from reels 2 fast enough to keep the leveling and shearing stations supplied even when the coil of metal on said reel is at its smallest diameter. This relatively fast speed is too great when the coil of metal is of a larger diameter and reels 2 will feed metal faster than it can be used by the leveling station 3 and the shearing station 4.

In order to control the excessive speed of reel motor 122, a hump actuated limit switch 193 (FIG. 6) is provided. As seen in FIG. 1 a strand, or strands, of wire 194 are stretched above the path of the sheet metal from reels 2 to the leveling station 3. When the sheet metal is fed faster than it can be used, a hump will form in said metal between the reel 2 from which it unwinds and the speed control feeder rollers 20–23. As this hump grows in size it engages wires 194 which are in turn connected to the armature of limit switch 193 (FIG. 8). When switch 193 is closed by the formation of a hump, a circuit 195 is closed to tank solenoid 117 energizing said solenoid to position valve 116 (see also FIG. 7) so that the fluid which is being directed toward reel motors 122 will choose the path of least resistance and go through valve 116 back to reservoir 102 thereby stopping reel motor 122. As the metal is flattened and sheared and the hump diminishes in size, switch 193 is once again opened breaking the circuit to solenoid 117 and moving valve 116 to an inoperative position thereby again channeling fluid under pressure to reel motor 122.

In summarizing the operation of the machine in its leveling and shearing operations, sheet metal is fed from one of the reels 2 between the upper and lower speed controlling feed rollers of the pairs thereof, between the upper and lower leveling rollers and between the shear blades to the run-out table. At this time clamps 84 and 83 are inoperative. When the desired length of sheet metal has passed shear blades clamps 44 and 83 are urged to their metal clamping positions and hydraulic motor 70 is immediately stopped. Rollers 21, 23 are immediately raised out of feeding engagement with the sheet metal thereby allowing said rollers to continue rotating and synchronous motor 31 to remain in synchronous operation. Shear blade 90 is lowered shearing the metal and then raised again and the machine is ready to repeat the process.

When the desired number of sheets of metal have been leveled and sheared, the unused metal which has been extended may then be rewound onto the reel 2 from which it came. Referring to FIG. 8, rewinding is accomplished by closing a circuit 198 with a reverse starter switch 199 to the reverse starter coil 200 of starter relay 153. This shifts the contacts in relay 153 and reverses the phasing of current to synchronous motor 31 causing it to run in reverse. Closed circuit 198 also energizes the coil 202 of relay 173 moving switch 172 to the other of its two positions. This in turn closes a circuit to solenoids 135, 141 of valves 143, 140 respectively through incoming lines 179, 180 and 181. When solenoids 135, 141 are energized, valves 134, 40 are positioned to withdraw the pistons of cylinders 86, 45, thereby moving clamps 83, 44, to inoperative positions.

Closed circuit 198 also energizes solenoid 129 of valve 127 through a branch circuit 203. Referring to FIGS. 3, 7 and 8, when solenoid 129 is energized, valve 127 is shifted to a position to run hydraulic motor 70 in reverse.

The manually actuated stack valve 121 is also positioned to operate reel motors 122 in the reverse thereby rewinding the extended unused sheet metal on reel 2.

In the event that a hump exists in the metal, thereby closing the switch 193 when it is desired to rewind the metal onto reels 2, it will be necessary to open that circuit again in order to supply reel motors 122 with fluid under pressure and operate reels 2. For this purpose a rewind switch 203 is provided which by-passes switch 193 by breaking the circuit to solenoid 117 of valve 116 allowing said valve to be spring urged to its inoperative position and thereby supplying fluid to motor 122.

The accuracy of the present leveling and shearing device is derived from the fact that the flattened sheet metal is fed past shear blades 78, 90 at an accurately controlled, constant speed. The reaction time for the various hydraulic cylinders and valves can therefore be accurately accounted for in locating limit switch 100 on run-out table 5.

It should be understood that hydraulic motor 70 is by itself sufficient to feed metal of a wide variety of gauges through leveling rollers 50–53 and past shear blades 78, 90, motor 70 being the primary driving means. However, the speed of hydraulic motor 70 is not constant under varying loads. When thicker metals are fed between the leveling rollers, motor 70 will be slowed down somewhat and will speed up when thinner metals are being leveled. Inaccuracies in the speed of the metal as it passes shear blades 70, 90, and contacts switch 100, will be reflected in inaccurate lengths of the sheared metal.

It is the purpose of synchronous motor 31 to stabilize the speed of the sheet metal to a constant speed as it is fed past the shear blades, motor 31 being a secondary driving means and a breaking means. When motor 31 is in synchronous operation it will overcome the tendency of thicker gauges of metal to slow down hydraulic motor 70 and also the tendency of thinner gauges of metal to speed up motor 70. The pull-in, pull-out range of synchronous operation of motor 31 is such that it cannot be taken out of synchronous operation by any gauge or width of sheet metal which the machine is designed to handle.

Since it takes time for a synchronous motor to enter its synchronous phase of operation, the importance of keeping motor 31 in synchronous operation by disengaging rollers 20, 22 and 21, 23 from sheet metal while it is stopped to be sheared is important to the continuous operation of the machine.

The method practiced in the present invention is that of driving sheet metal of different widths and gauges, a varying load, at a predetermined constant rate of speed, to assure accurate measurement of lengths of the sheet metal for shearing, by a primary varying source of driving power (hydraulic motor 70) and a secondary source of power (synchronous motor 31) operatively connected to the primary source, the secondary source being effective as a driving power only when the primary source tends to drive the sheet metal slower than the predetermined constant rate of speed and the secondary source acting to slow down the sheet metal as a braking force when the primary source of power tends to drive the sheet faster than the predetermined constant rate of speed.

It can be said that motor 31 tends to increase or decrease the load on motor 70 depending on whether the load on motor 70 is respectively less than or more than a predetermined load.

It should be understood that the above detailed description discloses the preferred form of the present invention but it is not intended to be limiting, as modifications may occur to those skilled in the art which do not depart from the spirit of this invention and which come within the scope of the appended claims.

I claim:
1. In apparatus for feeding a sheet of metal from a coil at a constant speed, which apparatus includes a first pair of driving rollers spaced from said coil, one roller above and the other rollers below said sheet, and a second pair of driving rollers, one above and one below said sheet at a point between said coil and said first pair of rollers:
  (a) means supporting said first pair of rollers in driving relation to said sheet and a hydraulic motor connected with at least one of the rollers of said first pair for rotation thereof to drive said sheet from said coil;
  (b) an electric synchronous motor connected with at least one roller of said second pair for rotation thereof in a direction to drive said sheet from said roll toward said first pair of rollers;
  (c) means for connecting said rollers of said second pair in driving relation to each other;
  (d) means supporting said rollers of said second pair for movement into and out of driving relation to said sheet whereby said synchronous motor may be kept in synchronous operation when said rollers of said second pair are out of driving relation to said sheet;
  (e) means for holding said sheet stationary and away from said continuously rotating rollers of said second pair when said rollers of said second pair are out of driving relation to said sheet.

2. The apparatus of claim 1, wherein:
  (f) said synchronous electric motor having a driving effect on said sheet only when said hydraulic motor tends to drive said sheet slower than a predetermined constant rate of speed and said synchronous motor having a braking effect on the driving of said sheet when said hydraulic motor tends to drive said sheet faster than said predetermined constant rate of speed.

3. In apparatus for leveling and shearing a sheet of metal advancing from a coil thereof along a path of travel, which apparatus includes leveling rollers spaced from said coil along said path and so positioned above and below said sheet as to deform said path relieving any stress in said sheet, and speed controlling rollers above and below said sheet spaced from said coil along said path:
  (a) means supporting said leveling rollers in driving relation to said sheet and a hydraulic motor connected with at least one of said leveling rollers for rotation thereof to drive said sheet from said coil;
  (b) an electric synchronous motor connected with one of said speed controlling rollers for rotation thereof at a constant rate of speed in a direction away from said coil, said speed controlling rollers stabilizing the speed of said sheet through said leveling rollers to said constant rate of speed when said leveling rollers tend to drive said sheet faster or slower than said constant rate of speed;
  (c) means for interconnecting said speed controlling rollers in continual driving relation to each other;
  (d) means supporting said speed controlling rollers for movement into and out of driving relation to said sheet so said synchronous motor can be kept in a synchronous phase of operation when said speed controlling rollers are out of driving relation to said sheet.

4. The apparatus of claim 3, including:
  (e) clamping means adjacent said speed controlling rollers for stopping the movement of said sheet therethrough and holding said sheet away from said continually rotating speed controlling rollers when said rollers are out of driving relation to said sheet.

5. The apparatus of claim 4, including:
  (f) shearing means spaced from said coil farther along said path than said leveling and speed controlling rollers and adapted to shear metal passing therethrough;
  (g) measuring means adjustably movable along said path outwardly of said shearing means for measuring a length of said sheet of metal to be sheared and for sensing the end of said sheet when it reaches said length beyond said shearing means;
  (h) means interconnecting said measuring means, said hydraulic motor, said means supporting said speed controlling rollers, said clamping means and said shearing means simultaneously instantly stopping said hydraulic motor, moving said means supporting said speed controlling rollers so that said rollers are out of driving relation to said sheet, actuating said clamping means and actuating said shearing means when said end of said sheet is sensed by said measuring means.

6. In apparatus for leveling and shearing an elongated sheet of metal from a coil thereof:
  (a) a storage station including a driven reel adapted to receive said coil thereon, said reel being driven by a hydraulic motor;
  (b) a leveling station adjacent said storage station along the path of travel of said sheet including leveling rollers, at least one of which is operatively connected to a hydraulic motor for driving said sheet through said leveling rollers;

(c) said leveling station including speed controlling rollers being interconnected for continual rotation together by a synchronous electric motor which is operatively connected to one of said speed controlling rollers for stabilizing the speed of said sheet through said leveling rollers, said speed controlling rollers being mounted for movement into and out of driving relation of said sheet;

(d) hydraulic means for moving said speed controlling rollers into driving relation with said sheet;

(e) a shearing station adjacent said leveling station along said path including a pair of shearing blades, one of which being stationary and the other being movable into and out of shearing relation with said stationary blade by hydraulic reciprocating means;

(f) separate hydraulically actuated clamping means included in said shearing and leveling stations for respectively holding said sheet stationary during the shearing thereof and holding said sheet stationary and away from said continually rotating speed controlling rollers when the latter are out of driving relation to said sheet;

(g) said hydraulic motor for driving said reel, said hydraulic motor connected to said one leveling roller, said hydraulic means for moving said speed controlling rollers, said hydraulic reciprocating means and said separate hydraulically actuated clamping means being operatively interconnected in a single hydraulic system with a common source of hydraulic fluid.

7. In the method of feeding a sheet of metal at a constant predetermined rate of speed from a coil thereof, which method includes engaging said sheet in driving relation thereto at a pair of separate, spaced points longitudinally of said sheet and spaced from said coil:

(a) simultaneously applying a first driving force to said sheet at one point of said pair and applying a second driving force to said sheet at the other point of said pair thereof;

(b) said driving force at said first point being operative for moving said sheet from said coil past both said one point and said other point at varying speeds under varying loads, and at said constant predetermined rate of speed only under a uniform predetermined load, independently of said second driving force at said other point;

(c) said second driving force at said other point being operative for moving said sheet at said constant predetermined rate of speed only irrespective of the load whereby variations in said load will be ineffective for varying the rate of speed of said sheet and said second driving force at said other point will be effective on said sheet only when said load is above and below said uniform predetermined load.

References Cited
UNITED STATES PATENTS

| | | | |
|---|---|---|---|
| 2,003,027 | 5/1935 | Wright | 83—209 |
| 2,480,781 | 8/1949 | Simpson | 83—209 |
| 3,016,772 | 1/1962 | Hornbostel | 72—28 |
| 3,187,530 | 6/1965 | Ranney | 72—29 |

RICHARD J. HERBST, *Primary Examiner.*

R. D. GREFE, *Assistant Examiner.*